W. R. WEBSTER.
SHEET METAL NUT AND METHOD OF MAKING THE SAME.
APPLICATION FILED FEB. 6, 1913.
1,088,641.
Patented Feb. 24, 1914.
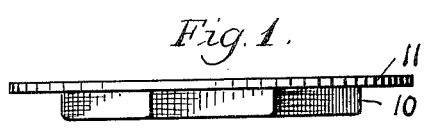
Fig. 1.
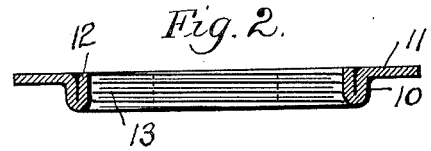
Fig. 2.
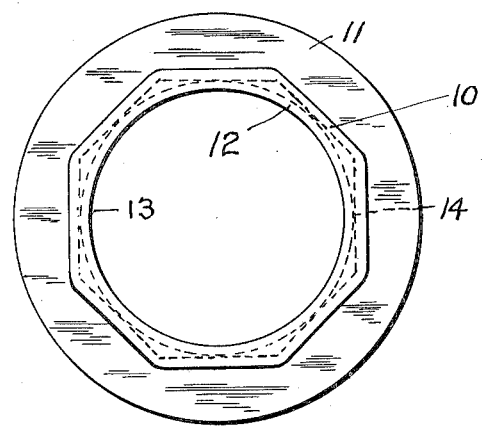
Fig. 3.
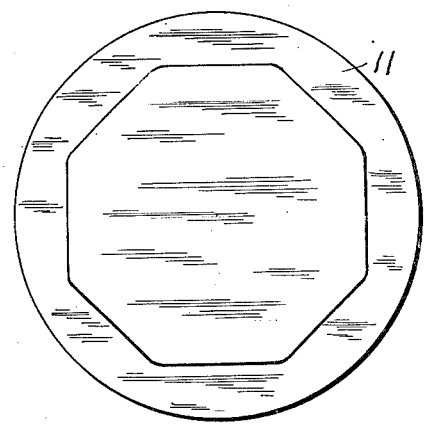
Fig. 7.
Fig. 4.
Fig. 5.
Fig. 6.
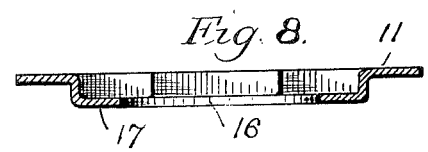
Fig. 8.
Fig. 9.
WITNESSES:
Mary E. Fuller.
M. C. Williams
INVENTOR:
William R. Webster
BY
Beach & Fisher
ATTORNEYS.

UNITED STATES PATENT OFFICE.

WILLIAM R. WEBSTER, OF BRIDGEPORT, CONNECTICUT, ASSIGNOR TO BRIDGEPORT BRASS COMPANY, OF BRIDGEPORT, CONNECTICUT, A CORPORATION OF CONNECTICUT.

SHEET-METAL NUT AND METHOD OF MAKING THE SAME.

1,088,641.   Specification of Letters Patent.   Patented Feb. 24, 1914.

Application filed February 6, 1913. Serial No. 746,566.

*To all whom it may concern:*

Be it known that I, WILLIAM R. WEBSTER, a citizen of the United States, residing in Bridgeport, county of Fairfield, and State of Connecticut, have invented certain new and useful Improvements in Sheet-Metal Nuts and Methods of Making the Same, of which the following is a full, clear, and exact description.

This invention relates to nuts constructed of sheet metal and more especially to those intended for use in connection with pipe couplings. The embodiment of my invention which I have selected for illustration, is especially designed for use on a spud such as commonly employed for connecting a water closet bowl with the flushing tank, but it will be understood that nuts constructed in accordance with the invention may be employed to advantage for many other purposes.

One of the primary objects of the invention is to provide a strong, efficient nut which may be manufactured at a very low cost. By the improvements herein described, I am enabled to produce an outwardly flanged spud nut from a minimum amount of stock and to decrease the bulk and weight of the article without impairing its efficiency.

Another object of my invention is to provide an improved method of making sheet metal nuts, whereby a nut of the desired form may be stamped up, in a minimum number of operations, from a flat blank of sheet metal. The improved method is particularly useful in manufacturing a sheet metal nut having a lateral outturned flange to compress a gasket or the like.

To these and other ends, the invention consists in the novel features to be hereinafter described and claimed.

In the accompanying drawing, Figure 1 is a side elevation of a spud nut constructed in accordance with my invention, Fig. 2 is an axial section of the same, Fig. 3 is a bottom plan view of Fig. 1, and Figs. 4 to 9 inclusive, illustrate various stages in the process of manufacturing the nut shown in Figs. 1, 2 and 3, Fig. 7 being a bottom plan view of the blank shown in Fig. 6.

In the embodiment shown in Figs. 1 to 3 inclusive, the nut consists of a hollow polygonal body 10 of sheet metal having a lateral flange 11 at one end integral with said body. At the opposite end of the body 10 the latter has formed integral therewith a cylindrical wall 12. The flat exterior faces of the body 10 afford a grip for the wrench, while the threads 13 of the nut are cut or otherwise formed on the inner surface of the cylindrical wall 12. This wall 12 is substantially parallel to the axis of the nut *i. e.* at right angles to the flange 11, and in the form shown it lies within the body 10 so as to reinforce the same. Referring to Fig. 2, it will be seen that the wall 12 is formed by curling or drawing inward a portion of the metal which extends integrally from the body 10 at that face of the nut which is opposite the flange 11. The wall 12 is preferably as wide as the width of the body 10 added to the thickness of the flange 11, so that the threaded wall extends throughout the axial dimension of the nut and supports interiorly the flange 11 as well as the body 10. The opening defined by the flange 11 is a continuation of the polygonal opening defined by the body 10, and the outer cylindrical surface of the wall 12 is preferably in abutment with the flat inner faces of the common opening defined by the body and the flange, as shown at 14 in Fig. 3. I prefer to form this opening with at least eight sides, so that the wall 12 may be rather closely conformed to the body and flange. In case the interior of the body 10 is octagonal, the exterior thereof is of course likewise octagonal, thereby providing eight wrench faces, as in the example shown.

The form of nut just described, is constructed by the following method: I take a flat disk 15 of sheet metal and cup it in polygonal (preferably octagonal) form, as shown in Fig. 5. In the case illustrated, an octagonal punch is brought down centrally on the disk, and said punch is of such size that it will cup the central part only of the blank, leaving the peripheral portion thereof in its original condition, whereby the lateral flange 11 is formed around the cup. This cupping operation gives the blank the general cup shaped form desired, but it is expedient to then subject the cupped blank to a stamping operation which perfects the form of the octagon by straightening the sides thereof and accentuating its angles. The bottom of the cup is then pierced to present a circular central aperture 16 which is defined by a lateral flange 17 extending around the outer bottom part of the pierced cup. In constructing the nut shown in Figs. 1 to 3, the flange 17 will be of a width corresponding to the width of the side wall of the cup including the thickness of the flange 11. The flange 17 is then drawn or turned inwardly by means of suitable tools to form the internal wall 12 previously described. The inner surface of the wall 12 is then threaded in a suitable manner and the nut is complete.

In the broader aspects of the invention, it is not always necessary to provide the polygonal body with a lateral outturned flange at one end. As far as the method of manufacturing is concerned, it may be advisable in some cases to pierce the blank before or during the cupping operation instead of after the cupping operation. Modifications in these and other respects may be adopted within the scope of the invention as defined in the claims.

What I claim is:

1. The method of making a sheet metal nut, which comprises cupping a flat sheet metal blank in polygonal form, piercing the central portion of the blank to form a flange extending around the bottom of the cup, bending the blank at the junction of such flange with the side wall of the cup so as to turn such flange out of its normal plane, and to present a wall directly axially of the blank, and having its outer diameter approximating the minimum interior diameter of the side wall of the cup, and then threading the nut thus constructed; substantially as described.

2. The method of making a sheet metal nut, having an outturned flange, which comprises forming a circular disk of sheet metal with a polygonal cup of less diameter than the disk, so as to create a lateral outturned flange around the cup, piercing the central portion of the blank with a circular opening to create an inwardly directed flange around the bottom of the cup, bending the blank at the junction of said last named flange with the side wall of the cup, so as to turn such flange out of its normal plane and present a wall directed axially of the blank, and having an exterior diameter approximating the minimum interior diameter of the cup, and then threading the nut thus constructed; substantially as described.

3. The method of making a sheet metal nut, which comprises cupping a flat blank in polygonal form, piercing the blank centrally to form a circular opening in the bottom of the cup, defined by an inwardly projecting flange, turning such flange upward within the body of the cup into abutment with the side wall of the latter, and threading the nut thus constructed; substantially as described.

4. The method of making a sheet metal nut, which comprises cupping a flat blank in polygonal form, then piercing the bottom of the cup with a circular opening of less diameter than the cup, to present an inwardly directed flange, then bending such flange upwardly within the cup so that its outermost surface with respect to the center of the blank is brought into abutment with the inner flat surfaces of the side walls of the cup, and then threading the inner surface of the inwardly turned flange; substantially as described.

5. The method of making a sheet metal nut, having an outturned flange, which comprises cupping a disk centrally to create a cup of less diameter than the disk, piercing the blank centrally with a circular opening of less diameter than the cup, turning the whole of the flange around said opening inward into the cup, and threading the blank to complete the nut; substantially as described.

6. The method of making a sheet metal nut having an outturned flange, which comprises forming a polygonal cup in the central or middle portion of a flat sheet metal blank, such cup being of dimensions to leave a lateral outturned flange around the top of the cup, piercing the blank with a circular opening of less diameter than the cup to present an inwardly directed flange, bending said last named flange out of its normal plane, and threading said flange; substantially as described.

7. The method of making an outwardly flanged sheet metal nut, which comprises forming a circular disk of sheet metal with a polygonal cup of less diameter than the disk so as to create a lateral outturned flange around the cup, piercing the central portion of the blank with a circular opening to create an inwardly directed flange, bending said flange to create a cylindrical wall directed axially of the blank, and threading the interior surface of said wall; substantially as described.

8. The method of making a sheet metal nut, which comprises cupping a flat circular sheet metal blank to produce a polygonal cup of less diameter than the blank, so that the periphery of the latter constitutes a lateral outturned flange on the cup, then piercing the bottom of the cup with a circular opening of less diameter than the cup, turning inward within the cup the flange around said opening and abutting the outer surface of such flange against the flat inner surfaces of the cup, and then threading the inner surface of such flange; substantially as described.

9. A sheet metal nut, comprising inner and outer walls in substantial abutment with each other and integrally connected with each other by a bent portion at one end of the nut, the outer wall being provided at the opposite end of the nut with an integral outturned flange of greater diameter than said wall; substantially as described.

10. A sheet metal nut, comprising inner and outer walls in substantial abutment with each other, said walls being integrally connected with each other by a bent portion at one end of the nut, and the outer wall being provided at the opposite end of the nut with a laterally directed flange of greater diameter than said outer wall and located in a plane substantially in alinement with the free end or edge of the inner wall; substantially as described.

11. As an article of manufacture, a nut comprising a sheet metal polygonal body, an outturned flange integral with said body at one end, and a cylindrical wall integral with said body at the other end, and having an exterior diameter approximating the minimum interior diameter of said polygonal body; substantially as described.

12. As an article of manufacture, a nut comprising a sheet metal polygonal body, a lateral flange integral with said body at one end, and of greater diameter than said body, and an axially directed interiorly threaded cylindrical wall integral with said body at the other end thereof, and having an exterior diameter approximating the minimum interior diameter of said polygonal body; substantially as described.

13. As an article of manufacture, a nut having a polygonal sheet metal outer wall and an interiorly threaded reinforcing inner wall in abutment with the outer wall; substantially as described.

14. As an article of manufacture, a nut comprising a hollow body having an integral outturned flange, said body having an interior polygonal opening, and a cylindrical inturned wall integral with said body and having its outer surface in abutment with the flat inner surfaces of such opening; substantially as described.

15. As an article of manufacture, a sheet metal nut having a flat outwardly and laterally directed flange at one end, and an inwardly turned threaded wall at the opposite end, having its free edge located in substantially the same plane as said flange; substantially as described.

In witness whereof, I have hereunto set my hand on the 31st day of Jan., 1913.

WILLIAM R. WEBSTER.

Witnesses:
C. E. HUTCHINSON,
O. H. PETERSON.